US012674086B2

(12) United States Patent
Kim et al.

(10) Patent No.: US 12,674,086 B2
(45) Date of Patent: Jul. 7, 2026

(54) SEALANT COMPOSITION

(71) Applicant: KCC Silicone Corporation, Seoul (KR)

(72) Inventors: Hyoung Chul Kim, Jeollabuk-do (KR); Woo Jin Lee, Gyeongsangnam-do (KR); Hyun Min Yim, Jeollabuk-do (KR); Myung Su Ahn, Jeollabuk-do (KR)

(73) Assignee: KCC Glass Corporation, Seoul (KR)

( * ) Notice: Subject to any disclaimer, the term of this patent is extended or adjusted under 35 U.S.C. 154(b) by 793 days.

(21) Appl. No.: 18/080,254

(22) Filed: Dec. 13, 2022

(65) Prior Publication Data

US 2023/0193099 A1 Jun. 22, 2023

(30) Foreign Application Priority Data

Dec. 22, 2021 (KR) ........................ 10-2021-0185202

(51) Int. Cl.

*C09J 183/06* (2006.01)
*C09J 11/04* (2006.01)
*C09J 11/08* (2006.01)

(52) U.S. Cl.

CPC ............. *C09J 183/06* (2013.01); *C09J 11/04* (2013.01); *C09J 11/08* (2013.01)

(58) Field of Classification Search

None
See application file for complete search history.

(56) References Cited

U.S. PATENT DOCUMENTS 7,605,203 B2 10/2009 Feng et al.
8,088,852 B2 * 1/2012 Araki .................... C09J 183/14 524/588
11,401,419 B2 8/2022 Uta et al.
2005/0192387 A1 9/2005 Williams et al.
2006/0270770 A1 11/2006 Feng et al.
2010/0234517 A1 * 9/2010 Plantenberg ............... C08J 3/03 524/501
2010/0246308 A1 9/2010 Ide
2011/0269918 A1 * 11/2011 Hamamoto .......... H10H 20/854 525/478
2019/0177542 A1 6/2019 Uta et al.
2019/0263970 A1 8/2019 Lee et al.
2024/0166877 A1 * 5/2024 Takeuchi ................ C08L 83/04

FOREIGN PATENT DOCUMENTS

EP 1106654 A2 * 6/2001 .............. C08L 83/04
JP H10-316804 A 12/1998
JP 3033160 B2 4/2000
JP 5042703 B2 * 10/2012 ............... C08K 3/26
JP 6116497 B2 4/2017
JP 2018-184520 A 11/2018
KR 10-2002-0080809 A 10/2002
KR 10-2006-0117259 A 11/2006
KR 10-2008-0011431 A 2/2008
KR 10-1478607 B1 1/2015
KR 10-2019-0046849 A 5/2019
KR 10-2020-0021177 A 2/2020
WO WO-2006088646 A1 * 8/2006 ................ C08J 5/04

OTHER PUBLICATIONS

Extended European Search Report issued in corresponding European Patent Application No. 22208955.9 dated May 26, 2023.
Notice of Allowance issued in corresponding Korean Patent Application No. 10-2021-0185202, dated Aug. 4, 2025.

* cited by examiner

*Primary Examiner* — Robert S Jones, Jr.
*Assistant Examiner* — Christiaan Roelofse
(74) *Attorney, Agent, or Firm* — Morgan, Lewis & Bockius LLP

(57) ABSTRACT

The present invention relates to a sealant composition, including: organohydroxypolysiloxane, precipitated calcium carbonate, ground calcium carbonate, carbon black, a thickener, and a curing agent, wherein the thickener is polyether-modified organopolysiloxane.

5 Claims, No Drawings

SEALANT COMPOSITION

CROSS-REFERENCE TO RELATED APPLICATION

This application claims priority under 35 U.S.C. § 119(a) to Korean Patent Application No. 10-2021-0185202 filed on Dec. 22, 2021, the entire contents of which are incorporated herein by reference.

BACKGROUND

(a) Technical Field

The present invention relates to a sealant composition having an excellent curing rate and thus capable of shortening a manufacturing time of a product, having excellent workability due to appropriate thixotropy, and having excellent hardness, tensile strength and the like of the cured product.

(b) Background Art

Multi-layer glass is typically manufactured by disposing glass panels to be parallel to each other and sealing the periphery so that the space between these panels or the inner space is completely enclosed. Such multi-layer glass has smaller heat energy loss compared to a single glass panel by including an air insulation layer in the inner space. In addition, the multi-layer glass is capable of further enhancing performance on heat energy loss by increasing a gap between the panels.

A sealant composition disposed between the panels of such multi-layer glass and used for sealing typically includes silicone oil or silicone polymer, calcium carbonate, a filler such as silica and a curing agent. Specifically, Korean Patent No. 1478607 (Patent Document 1) discloses a room-temperature-curable polyorganosiloxane composition comprising (A) straight-chain polyorganosiloxane having a molecular chain terminal being sealed with a silanol group or a silicon atom-bonded hydrolysable group, (B) an organic silicon compound having 3 or more silicon atom-bonded hydrolysable groups in a single molecule, (C) a condensation reaction catalyst, (D) ground calcium carbonate and (E) precipitated calcium carbonate. A curing rate of such a conventional sealant composition is commonly about 2 mm/1 day, and a curing rate of a sealant composition is a factor that greatly affects productivity of multi-layer glass. Specifically, when a curing rate of a sealant composition is too slow, a settling time after manufacturing multi-layer glass increases, which causes a decrease in productivity by increasing working space and waiting time.

Accordingly, research and development on a composition suitable as a sealant for multi-layer glass by capable of enhancing productivity of multi-layer glass by having an appropriate curing rate, having excellent workability due to appropriate thixotropy, and by having excellent properties such as hardness and tensile strength of the manufactured cured product has been required.

PRIOR ART DOCUMENT

Patent Document (Patent Document 1) Korean Patent No. 1478607 (Published date: 2010 Sep. 15)

SUMMARY OF THE DISCLOSURE

In view of the above, the present invention is directed to providing a composition suitable as a sealant for multi-layer glass capable of enhancing productivity of multi-layer glass by having an appropriate curing rate, having excellent workability due to appropriate thixotropy, and having excellent properties such as hardness and tensile strength of the manufactured cured product.

One embodiment of the present invention provides a sealant composition including: organohydroxypolysiloxane, precipitated calcium carbonate, ground calcium carbonate, carbon black, a thickener, and a curing agent, wherein the thickener comprises polyether-modified organopolysiloxane.

A sealant composition according to the present invention is capable of enhancing productivity of multi-layer glass by having an appropriate curing rate, and has excellent workability due to appropriate thixotropy. In addition, a cured product manufactured from the sealant composition has excellent hardness and tensile strength, and therefore, can be suitably used as a sealant for multi-layer glass.

DETAILED DESCRIPTION

Hereinafter, the present invention will be described in detail.

"Viscosity" used in the present specification is measured using common methods known in the art, and for example, may be measured using a Brookfield LVDV viscometer or the like.

A sealant composition according to the present invention includes organohydroxypolysiloxane, precipitated calcium carbonate, ground calcium carbonate, carbon black, a thickener and a curing agent. Specifically, by the sealant composition according to the present invention including precipitated calcium carbonate, ground calcium carbonate and carbon black as a filler, workability may be enhanced by properly adjusting viscosity of the sealant composition using the filler, and mechanical strength of the manufactured cured product may be enhanced.

Organohydroxypolysiloxane

The organohydroxypolysiloxane includes a hydroxyl group, and forms a main skeleton as a main polymer of the sealant composition, thereby forming an elastic network.

The organohydroxypolysiloxane may not include, for example, an alkenyl group, and specifically, may include a hydroxyl group (OH) at the end without including an alkenyl group. More specifically, the organohydroxypolysiloxane may be represented by the following Chemical Formula 3.

[Chemical Formula 3]

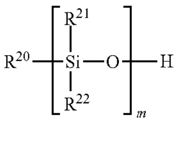

In Chemical Formula 3, $R^{20}$ is a substituted or unsubstituted $C_{1-10}$ alkyl group or a hydroxyl group, $R^{21}$ and $R^{22}$ are each independently a substituted or unsubstituted $C_{1-10}$ alkyl group, and m is a real number of 560 to 660.

Specifically, $R^{20}$ is a substituted or unsubstituted $C_{1-4}$ alkyl group or a hydroxyl group, $R^{21}$ and $R^{22}$ are each independently a substituted or unsubstituted $C_{1-6}$ alkyl group or $C_{1-3}$ alkyl group. Herein, the alkyl group may be linear or branched.

In addition, m may be a real number of 580 to 640, or 600 to 620.

The organohydroxypolysiloxane may have viscosity of 1,000 cP to 10,000 cP, or 3,000 cP to 7,000 cP at 25° C. When viscosity of the organohydroxypolysiloxane at 25° C. is less than the above-mentioned range, there may be a problem in flowability of the sealant composition, and the viscosity being greater than the above-mentioned range may cause a problem of insufficient workability since the sealant composition has insufficient thixotropy or has insufficient discharge property due to high viscosity.

In the organohydroxypolysiloxane, the hydroxyl group content may be from 0.01% by weight to 0.5% by weight, 0.03% by weight to 0.3% by weight, or 0.05% by weight to 0.10% by weight with respect to the total weight of the polysiloxane. When the hydroxyl group content of the organohydroxypolysiloxane is less than the above-mentioned range, there may be a problem of reducing curing performance of the sealant composition, and the content being greater than the above-mentioned range may cause a problem of reducing stability of the sealant composition.

In addition, the organohydroxypolysiloxane may be included in a content of 30% by weight to 40% by weight, 33% by weight to 40% by weight, or 34% by weight to 39% by weight with respect to the total weight of the sealant composition. The organohydroxypolysiloxane content being less than the above-mentioned range may cause a problem of insufficient workability caused by insufficient discharge property due to high viscosity of the sealant composition, and the content being greater than the above-mentioned range may cause a problem of insufficient workability caused by insufficient thixotropy of the sealant composition.

Precipitated Calcium Carbonate

The precipitated calcium carbonate performs a role of enhancing strength of a cured product of the sealant.

In addition, the precipitated calcium carbonate may have a BET specific surface area of 10 $m^2/g$ to 50 $m^2/g$, or 20 $m^2/g$ to 35 $m^2/g$. The precipitated calcium carbonate having a BET specific surface area of less than the above-mentioned range may cause a problem of insufficient workability caused by insufficient discharge property due to high viscosity of the sealant composition, and the BET specific surface area being greater than the above-mentioned range may cause a problem of insufficient thixotropy of the sealant composition.

The precipitated calcium carbonate may have an average particle diameter of 0.01 μm to 0.5 μm, or 0.05 μm to 0.1 μm. The precipitated calcium carbonate having an average particle diameter of less than the above-mentioned range may cause a problem of insufficient elasticity of a cured product of the sealant, and the average particle diameter being greater than the above-mentioned range may cause a problem of reducing hardness of a cured product of the sealant.

In addition, the precipitated calcium carbonate may have its surface treated with a resin or untreated.

The precipitated calcium carbonate may be included in a content of 6% by weight to 15% by weight, 7% by weight to 15% by weight, or 8% by weight to 14% by weight with respect to the total weight of the sealant composition. When the precipitated calcium carbonate content is less than the above-mentioned range, a problem of reducing tensile strength and hardness of a cured product of the sealant may occur, and the content being greater than the above-mentioned range may cause a problem of insufficient workability caused by insufficient discharge property due to high viscosity of the sealant composition.

In addition, the sealant composition may include the precipitated calcium carbonate, the ground calcium carbonate and the carbon black in a weight ratio of 1.2 to 7:8 to 20:1, a weight ratio of 1.5 to 6:9 to 17:1, or a weight ratio of 1.5 to 5:10 to 15:1. When the weight ratio of the precipitated calcium carbonate with respect to the carbon black weight is less than the above-mentioned range, that is, when a small amount of the precipitated calcium carbonate is included, a problem of reducing tensile strength and hardness of a cured product of the sealant may occur, and when the weight ratio is greater than the above-mentioned range, that is, when an excess amount of the precipitated calcium carbonate is included, there may be a problem of insufficient workability caused by insufficient discharge property due to high viscosity of the sealant composition. In addition, when the weight ratio of the ground calcium carbonate with respect to the carbon black weight is less than the above-mentioned range, that is, when a small amount of the ground calcium carbonate is included, a problem of reducing hardness of a cured product of the sealant may occur, and when the weight ratio is greater than the above-mentioned range, that is, when an excess amount of the ground calcium carbonate is included, there may be a problem of insufficient workability caused by insufficient discharge property due to high viscosity of the sealant composition.

Ground Calcium Carbonate

The ground calcium carbonate performs a role of providing mechanical strength to a cured product of the sealant.

In addition, the ground calcium carbonate may have a BET specific surface area of 0.1 $m^2/g$ to 5 $m^2/g$, or 0.5 $m^2/g$ to 2.0 $m^2/g$. The ground calcium carbonate having a BET specific surface area of less than the above-mentioned range may cause a problem of insufficient workability caused by insufficient discharge property due to high viscosity of the sealant composition, and the BET specific surface area being greater than the above-mentioned range may cause a problem of insufficient thixotropy of the sealant composition.

The ground calcium carbonate may have an average particle diameter of 1 μm to 10 μm, or 3 μm to 6 μm. The ground calcium carbonate having an average particle diameter of less than the above-mentioned range may cause a problem of insufficient workability caused by insufficient discharge property due to high viscosity of the sealant composition, and the average particle diameter being greater than the above-mentioned range may cause a problem in flowability of the sealant composition.

In addition, the ground calcium carbonate may have its surface treated with a resin or untreated.

The ground calcium carbonate may be included in a content of 36% by weight to 50% by weight, 37% by weight to 48% by weight, or 39% by weight to 45% by weight with respect to the total weight of the sealant composition. When the ground calcium carbonate content is less than the above-mentioned range, a problem of reducing tensile strength of a cured product of the sealant may occur, and the content being greater than the above-mentioned range may cause a problem of insufficient workability caused by insufficient discharge property due to high viscosity of the sealant composition.

Carbon Black

The carbon black performs a role of implementing a color of the sealant, and reinforcing mechanical properties.

In addition, the carbon black may have a DBP absorption amount of 100 mL/100 g to 150 mL/100 g, or 113 mL/100 g to 125 mL/100 g. The carbon black having a DBP absorption amount of less than the above-mentioned range may cause a problem of insufficient thixotropy of the sealant composition and a problem of reducing tensile strength of the cured product, and the DBP absorption amount being greater than the above-mentioned range may cause a problem of insufficient workability caused by insufficient discharge property due to high viscosity of the sealant composition.

The carbon black may have its surface treated with a resin or untreated.

In addition, the carbon black may be included in a content of 2% by weight to 5% by weight, 2.5% by weight to 4.5% by weight, or 3% by weight to 4.5% by weight with respect to the total weight of the sealant composition. When the carbon black content is less than the above-mentioned range, a problem of insufficient thixotropy of the sealant composition may occur, and the content being greater than the above-mentioned range may cause a problem of insufficient workability caused by insufficient discharge property due to high viscosity of the sealant composition.

Thickener

By including a polar group such as ethylene glycol that is a hydrophilic group and a non-polar alkyl group that is hydrophobic, polyether-modified organopolysiloxane, the thickener, physically reacts with the precipitated calcium carbonate to facilitate dispersion, and performs a role of enhancing viscosity and thixotropy of the sealant composition.

Precipitated calcium carbonate has a small particle size and high surface energy. Particularly, intermolecular forces, hydrogen bonding, electrostatic interactions and the like acting on a surface of precipitated calcium carbonate readily aggregate precipitated calcium carbonate or affect its effectiveness as a filler. In addition, the surface of precipitated calcium carbonate has a hydrophilic group such as a hydroxyl group (OH), and generally has a form of being non-uniformly dispersed into a polymer. The thickener is effective in enhancing dispersibility in the composition by reducing surface energy and increasing surface active groups of such precipitated calcium carbonate.

The thickener is polyether-modified organopolysiloxane. For example, the thickener may be represented by the following Chemical Formula 1.

[Chemical Formula 1]

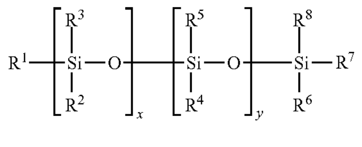

In Chemical Formula 1, $R^1$ to $R^4$ and $R^6$ to $R^8$ are each independently a substituted or unsubstituted $C_{1-10}$ alkyl group, $R^5$ is represented by the following Chemical Formula 2, and x and y are each independently from 0.1 to 15.

[Chemical Formula 2]

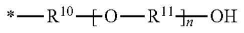

In Chemical Formula 2, $R^{10}$ and $R^{11}$ are each independently a substituted or unsubstituted $C_{1-10}$ alkylene group, n is from 5 to 20, and

* is a bonding hand bonding to silicon.

Specifically, $R^1$ to $R^4$ and $R^6$ to $R^8$ are each independently a substituted or unsubstituted $C_{1-6}$ alkyl group or $C_{1-3}$ alkyl group, x is a real number of 3 to 10 or 5 to 8, and y may be a real number of 1 to 6 or 2 to 4. Herein, the alkyl group may be linear or branched.

In addition, $R^{10}$ and $R^{11}$ are each independently a substituted or unsubstituted $C_{1-6}$ alkylene group or $C_{1-4}$ alkylene group, and n may be a real number of 6 to 15 or 8 to 12. Herein, the alkylene group refers to a branched, linear or cyclic divalent radical derived from removing two hydrogen atoms from a carbon atom. For example, the alkylene group may include methylene ($—CH_2—$), 1,1-ethylene ($—CH(CH_3)—$), 1,2-ethylene ($—CH_2CH_2—$), 1,1-propylene (—CH(CH2CH3)-), 1,2-propylene ($—CH_2CH(CH_3)—$), 1,3-propylene ($—CH_2CH_2CH_2—$), 1,4-butylene ($—CH_2CH_2CH_2CH_2—$), 2,4-butylene ($—CH_2(CH_3)CH_2CH_2—$) and the like, but is not limited thereto.

The thickener may have viscosity of 100 cP to 500 cP, or 250 cP to 450 cP at 25° C. When viscosity of the thickener at 25° C. is less than the above-mentioned range, a problem of insufficient thixotropy of the sealant composition may occur, and the viscosity being greater than the above-mentioned range may cause a problem of insufficient workability caused by insufficient discharge property due to high viscosity of the sealant composition.

In addition, the thickener may have a HLB value (hydrophile-lipophile balance) of 5 to 20, 10 to 15 or 11 to 14. When the thickener has a HLB value of less than the above-mentioned range, a problem of insufficient thixotropy of the sealant composition may occur, and the HLB value being greater than the above-mentioned range may cause a problem of insufficient workability caused by insufficient discharge property due to high viscosity of the sealant composition.

The thickener may be included in a content of 0.01% by weight to 0.5% by weight, 0.03% by weight to 0.4% by weight, or 0.05% by weight to 0.3% by weight with respect to the total weight of the sealant composition. The thickener content being less than the above-mentioned range may cause a problem of insufficient workability caused by insufficient discharge property due to high viscosity of the sealant composition, and the content being greater than the amount may cause a problem of insufficient thixotropy of the manufactured cured product.

In addition, the sealant composition may include the thickener, the carbon black and the precipitated calcium carbonate in a weight ratio of 1:5 to 400:20 to 500, a weight ratio of 1:5 to 200:30 to 400, or a weight ratio of 1:10 to 100:40 to 200. When the weight ratio of the carbon black with respect to the thickener weight is less than the above-mentioned range, that is, when a small amount of the carbon black is included, a problem of insufficient thixotropy of the sealant composition may occur, and when the weight ratio is greater than the above-mentioned range, that is, when an excess amount of the carbon black is included, there may be a problem of insufficient workability caused by insufficient discharge property due to high viscosity of the sealant composition. When the weight ratio of the precipitated calcium carbonate with respect to the thickener weight is less than the above-mentioned range, that is, when a small amount of the precipitated calcium carbonate is included, a problem of insufficient thixotropy of the sealant composition may occur, and when the weight ratio is greater than the above-mentioned range, that is, when an excess amount of the precipitated calcium carbonate is included, there may be a problem of insufficient workability caused by insufficient discharge property due to high viscosity of the sealant composition.

Curing Agent

The curing agent performs a role of curing the composition through a crosslinking reaction with the organohydroxypolysiloxane.

The curing agent may be a silane compound, and herein, the silane compound is not particularly limited as long as it is a silane curing agent commonly used for polysiloxane. Examples of the silane compound may include VOS (2-butanone, O,O',O"-(ethenylsilylidyne)trioxime), MOS (methyltris(methylethylketoxime)silane), TOS (butan-2-one, O,O',O",O'"-silanetetrayltetraoxime) and the like. Specifically, the silane compound may include VOS, MOS and TOS. Using a combination of VOS, MOS and TOS as the curing agent is effective in curing the sealant composition by the reactive group of the curing agent chemically reacting with the hydroxyl group of the organohydroxypolysiloxane.

Specifically, including VOS as the curing agent is effective in increasing a curing rate of the composition by including a vinyl group, including MOS is effective in that MOS, an oxime-type curing agent, cures the sealant composition, and including TOS is effective in increasing a curing rate of the composition by including a small amount of TOS, a silane including four reactive groups.

In addition, the curing agent may be included in a content of 1.2% by weight to 7% by weight, 1.5% by weight to 6% by weight, or 2% by weight to 5% by weight with respect to the total weight of the sealant composition. The curing agent content being less than the above-mentioned range may cause a problem of reducing quality stability within an available period of the sealant composition, and the content being greater than the above-mentioned range may cause a problem of reducing curing performance of the sealant composition.

Specifically, the curing agent may include, with respect to the total weight of the sealant composition, 0.6% by weight to 3% by weight, 0.7% by weight to 2.5% by weight or 1% by weight to 2% by weight of VOS, 0.5% by weight to 3.5% by weight, 0.6% by weight to 3.2% by weight or 0.9% by weight to 2.7% by weight of MOS, and 0.06% by weight to 0.5% by weight, 0.08% by weight to 0.35% by weight or 0.1% by weight to 0.3% by weight of TOS. When the VOS content is less than the above-mentioned range, problems of reducing hardness of the cured product and reducing stability of the sealant composition may occur, and the content being greater than the above-mentioned range may cause a problem of reducing curing performance of the sealant composition. In addition, when the MOS content is less than the above-mentioned range, a problem of reducing stability of the sealant composition may occur, and the content being greater than the above-mentioned range may cause a problem of reducing curing performance of the sealant composition. Furthermore, when the TOS content is less than the above-mentioned range, a problem of reducing curing performance of the sealant composition may occur, and the content being greater than the above-mentioned range may cause a problem of insufficient workability caused by insufficient discharge property due to high viscosity of the sealant composition.

Additive

The sealant composition may further include additives such as a plasticizer, a tackifier and a catalyst. Herein, each of the additives is not particularly limited as long as it is commonly usable in a sealant composition.

The plasticizer is not particularly limited as long as it is commonly usable in a sealant composition, and for example, may be a non-reactive silicone oil.

In addition, the plasticizer may be included in the composition in a content of 0.5% by weight to 3.0% by weight, 1.0% by weight to 3.0% by weight, or 1.5% by weight to 3.0% by weight with respect to the total weight of the sealant composition.

The tackifier may be a silane coupling agent, and for example, may be an amino group-containing silane compound. Specifically, the tackifier may be a silane coupling agent such as 3-glycidoxypropyltrimethoxysilane, 3-glycidoxypropylmethyldimethoxysilane, epoxycyclohexyl)ethyltrimethoxysilane, N-phenyl-γ-aminopropyltrimethoxysilane, N-(2-aminoethyl)3-aminopropylmethyldimethoxysilane, N-(2-aminoethyl)-3-aminopropyltrimethoxysilane, 3-aminopropyltriethoxysilane, 3-mercaptopropyltrimethoxysilane, vinyltrimethoxysilane, N-(2-(vinylbenzylamino)ethyl)-3-aminopropyltrimethoxysilane hydrochloride, 3-methacryloxypropyltrimethoxysilane, 3-chloropropylmethyldimethoxysilane or 3-chloropropyltrimethoxysilane.

In addition, the tackifier may be included in the composition in a content of 0.3% by weight to 2.0% by weight, 0.3% by weight to 1.7% by weight, or 0.3% by weight to 1.0% by weight with respect to the total weight of the sealant composition.

The catalyst is not particularly limited as long as it is commonly usable in a sealant composition, and for example, may be an organotin compound, an organotitanium compound, an amine compound or the like. Specifically, the catalyst may be an organotin compound such as dibutyltin dimethoxide, dibutyltin diacetate, dibutyltin dioctate, dibutyltin dilaurate, dibutyltin bis(acetylacetonate), dibutyltin bis(benzyl maleate), dimethyltin dimethoxide, dimethyltin diacetate, dioctyltin dioctate, dioctyltin dilaurate, tin dioctate or tin dilaurate; an organotitanium compound such as tetraisopropyl titanate, tetra-normal-butyl titanate, tetra-tertiary-butyl titanate, tetra-normal-propyl titanate, tetra-2-ethylhexyl titanate, diisopropyl-di-tertiary-butyl titanate, dimethoxytitanium bisacetylacetonate, diisopropoxy-di(ethoxyacetoacetyl) titanate, di-tertiary-butoxytitanium bisethylacetoacetate or di-tertiary-butoxytitanium bismethylacetoacetate; an amine compound such as 3-aminopropyltrimethoxysilane or tetramethylguanidylpropyltrimethoxysilane; or the like.

In addition, the catalyst may be included in the composition in a content of 0.001% by weight to 0.09% by weight, 0.005% by weight to 0.05% by weight, or 0.01% by weight to 0.02% by weight with respect to the total weight of the sealant composition.

The sealant composition of the present invention as described above is capable of enhancing productivity of multi-layer glass by having an appropriate curing rate, and has excellent workability due to appropriate thixotropy. In addition, a cured product manufactured from the sealant composition has excellent hardness and tensile strength, and may be suitably used as a sealant for multi-layer glass.

Hereinafter, the present invention will be described more specifically with reference to examples. However, these examples are only to help understand the present invention, and the scope of the present invention is not limited to these examples in any sense.

EXAMPLE

Experimental Examples 1 to 24. Preparation of Sealant Composition

A sealant composition was prepared by adding and mixing components described in the following Tables 1 to 3 by each content in a reactor.

TABLE 1

| | Experimental Example 1 | Experimental Example 2 | Experimental Example 3 | Experimental Example 4 | Experimental Example 5 | Experimental Example 6 | Experimental Example 7 | Experimental Example 8 |
|---|---|---|---|---|---|---|---|---|
| Organohydroxypolysiloxane-1 | 36.89 | 35.54 | 38.38 | 34.89 | 37.89 | 38.09 | 36.46 | 36.39 |
| Organohydroxypolysiloxane-2 | | | | | | | | |
| Precipitated Calcium Carbonate | 12 | 8 | 14 | 7 | 15 | 12 | 12 | 12 |
| Ground Calcium Carbonate Silica | 41 | 45 | 39 | 48 | 37 | 41 | 41 | 41 |
| Thickener-1 | 0.1 | 0.05 | 0.3 | 0.1 | 0.1 | 0.4 | 0.03 | 0.1 |
| Thickener-2 | | | | | | | | |
| First Curing Agent | 1.5 | 1 | 2 | 1.5 | 1.5 | 1.5 | 1.5 | 0.7 |
| Second Curing Agent | 2 | 3 | 1 | 2 | 2 | 2 | 2 | 3.5 |
| Carbon Black | 4 | 4.4 | 3 | 4 | 4 | 2.5 | 4.5 | 4 |
| Plasticizer | 2 | 2 | 2 | 2 | 2 | 2 | 2 | 2 |
| Tackifier | 0.5 | 1 | 0.3 | 0.5 | 0.5 | 0.5 | 0.5 | 0.3 |
| Catalyst | 0.01 | 0.01 | 0.02 | 0.01 | 0.01 | 0.01 | 0.01 | 0.01 |
| Total Amount | 100.00 | 100.00 | 100.00 | 100.00 | 100.00 | 100.00 | 100.00 | 100.00 |

TABLE 2

| | Experimental Example 9 | Experimental Example 10 | Experimental Example 11 | Experimental Example 12 | Experimental Example 13 | Experimental Example 14 | Experimental Example 15 | Experimental Example 16 |
|---|---|---|---|---|---|---|---|---|
| Organohydroxypolysiloxane-1 | 35.99 | 38.32 | | 28.49 | 33.89 | 32.89 | 37.89 | 36.885 |
| Organohydroxypolysiloxane-2 | | | 36.89 | | | | | |
| Precipitated Calcium Carbonate | 12 | 14 | 12 | 15 | 12 | 3 | 18 | 12 |
| Ground Calcium Carbonate | 41 | 39 | 41 | 50 | 41 | 54 | 34 | 41 |
| Silica | | | | | | | | |
| Thickener-1 | 0.1 | 0.3 | 0.1 | 0.1 | 0.1 | 0.1 | 0.1 | 0.005 |
| Thickener-2 | | | | | | | | |
| First Curing Agent | 2.4 | 2 | 1.5 | 1.5 | 1.5 | 1.5 | 1.5 | 1.5 |
| Second Curing Agent | 0.8 | 1 | 2 | 2 | 2 | 2 | 2 | 2 |
| Carbon Black | 4 | 3 | 4 | 0.4 | 7 | 4 | 4 | 4 |
| Plasticizer | 2 | 2 | 2 | 2 | 2 | 2 | 2 | 2 |
| Tackifier | 1.7 | 0.3 | 0.5 | 0.5 | 0.5 | 0.5 | 0.5 | 0.5 |
| Catalyst | 0.01 | 0.08 | 0.01 | 0.01 | 0.01 | 0.01 | 0.01 | 0.11 |
| Total Amount | 100.00 | 100.00 | 100.00 | 100.00 | 100.00 | 100.00 | 100.00 | 100.00 |

TABLE 3

| | Experimental Example 17 | Experimental Example 18 | Experimental Example 19 | Experimental Example 20 | Experimental Example 21 | Experimental Example 22 | Experimental Example 23 | Experimental Example 24 |
|---|---|---|---|---|---|---|---|---|
| Organohydroxypolysiloxane-1 | 36.19 | 35.39 | 35.39 | 36.89 | 36.89 | 42.89 | 36.99 | 36.89 |
| Organohydroxypolysiloxane-2 | | | | | | | | |
| Precipitated Calcium Carbonate | 12 | 12 | 12 | | 52 | 10 | 12 | 12 |
| Ground Calcium Carbonate | 41 | 41 | 41 | 52 | | 41 | 41 | 41 |
| Silica | | | | 1 | 1 | | | |
| Thickener-1 | 0.8 | 0.1 | 0.1 | 0.1 | 0.1 | 0.1 | | |
| Thickener-2 | | | | | | | | 0.1 |
| First Curing Agent | 1.5 | | 5 | 1.5 | 1.5 | 1.5 | 1.5 | 1.5 |
| Second Curing Agent | 2 | 5 | | 2 | 2 | 2 | 2 | 2 |
| Carbon Black | 4 | 4 | 4 | 4 | 4 | | 4 | 4 |
| Plasticizer | 2 | 2 | 2 | 2 | 2 | 2 | 2 | 2 |
| Tackifier | 0.5 | 0.5 | 0.5 | 0.5 | 0.5 | 0.5 | 0.5 | 0.5 |
| Catalyst | 0.01 | 0.01 | 0.01 | 0.01 | 0.01 | 0.01 | 0.01 | 0.01 |
| Total Amount | 100.00 | 100.00 | 100.00 | 100.00 | 100.00 | 100.00 | 100.00 | 100.00 |

Product names of each of the components used in the experimental examples are shown in the following Table 4.

TABLE 4

| Component | Manufacturer | Product Name |
|---|---|---|
| Organohydroxypolysiloxane-1 | KCC | HEP-5K (polysiloxane containing hydroxyl group at both ends and methyl group in repeating unit, viscosity at 25° C.: 5,000 cP, hydroxyl group content: 0.07% by weight) |
| Organohydroxypolysiloxane-2 | KCC | HEP-20K (viscosity at 25° C.: 20,000 cP, hydroxyl group content: 0.04% by weight) |
| Precipitated Calcium Carbonate | SHIRAISHI KOGYO KAISHA | HAKUENKA CC (BET specific surface area: 27 $m^2/g$, average particle diameter: 0.08 μm) |
| Ground Calcium Carbonate | Omya Korea | Omyacarb 5T (BET specific surface area: 0.97 $m^2/g$, average particle diameter: 4.5 μm) |
| Silica | KCC | D-150 (fumed silica, BET specific surface area: 150 $m^2/g$) |
| Thickener-1 | KCC | SM3220P (viscosity at 25° C.: 300 cP, HLB value: 13)<br>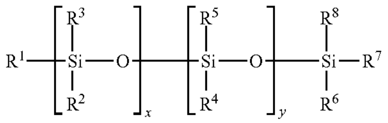<br>($R^1$ to $R^4$ and $R^6$ to $R^8$ are methyl group, $R^5$ is $-CH_2CH_2CH_2[OCH_2CH_2]_n-OH$, x is 7.7, y is 3, and n is 11.) |
| Thickener-2 | Hannong Chemicals Inc. | Koremul-PPG 400 (polypropylene glycol) |
| First Curing Agent | Honeywell Corporation | OS 2000 (VOS) |
| Second Curing Agent | SiSiB SILICONES | MT9010 (including MOS and TOS in weight ratio of 9:1) |
| Carbon Black | Cabot | MONARCH 280 (DBP absorption amount of 121 mL/100 g) |
| Plasticizer | KCC | MEP-100 (non-reactive silicone oil, viscosity at 25° C.: 100 cP) |
| Tackifier | Shin-Etsu | KBM-603 (N-(2-aminoethyl)3-aminopropyltrimethoxysilane) |
| Catalyst | SONGWON | TL-100 |

Test Example: Evaluation of Properties

Properties of the sealant compositions of the experimental examples and cured products manufactured therefrom were measured in the following manner, and the results are shown in Tables 5 to 8.

(1) Adhesiveness

As in the manufacture of multi-layer glass, the degree of adhesion between an aluminum rod and glass was measured.

Specifically, as the adhesive specimen, an aluminum rod and glass were prepared, and the surface was washed with isopropyl alcohol (IPA). After that, the sealant composition was coated on the glass, and after adhering the washed aluminum rod on the coated sealant composition, the result was cured under a condition of a temperature of 23° C. and relative humidity of 50% to prepare the specimen. After that, the specimen was stored for 3 days under a condition of a temperature of 23° C. and relative humidity of 50%, and the degree of adhesion was evaluated (CF: cohesive failure).

(2) Amount of Discharge

An amount of discharge is measuring the amount of the sealant composition flowing out when releasing the sealant composition for a certain period of time under a condition of certain pressure and certain nozzle, and is an experiment relating to workability of the sealant composition. Herein, having a small amount of discharge means the composition having high viscosity, which means taking a lot of force in working.

Specifically, the sealant composition was left unattended for 24 hours while maintaining a constant temperature and constant humidity condition (23° C., relative humidity 50%), and a sealant air gun was connected to an air line. After that, a nozzle (diameter: 5 mm) was connected to the sealant composition, and the sealant air gun connected to a nitrogen gas cylinder was filled with the sealant composition. After that, an empty paper cup was placed on a scale to adjust the zero point, and after setting an air pressure to 2 kgf, the sealant composition was discharged into the paper cup for 10 seconds. A weight of the discharged sealant composition was measured with the scale.

(3) Slump

After caulking the sealant composition using the experimental method according to KS F 2621, the degree of flowing down while maintaining a right angle at 23° C. was measured to evaluate a slump. In addition, the sealant composition was stored for 1 week at 80° C. and then caulked in the same manner as above, and the degree of flowing down while maintaining a right angle was measured to evaluate a slump.

(4) Viscosity and Thixotropy

Viscosity of the sealant composition was measured using a spindle #7 of a Brookfield viscometer at 23° C., and the viscosity was measured at a rate of 5 rpm or 50 rpm.

In addition, thixotropy is a value obtained by dividing the viscosity measured at a rate of 5 rpm by the viscosity measured at a rate of 50 rpm, and is a property capable of determining flowability of the sealant composition.

(5) Hardness

A specimen having a thickness of 6 mm was prepared by coating the sealant composition using a jig having a thickness of 6 mm, and then cured for 24 hours. After that, hardness was measured using a SHORE A TYPE hardness tester as a measuring device.

Specifically, hardness was measured at an inside of 0.5 inch or greater from the edge of the specimen, and after repeating 5 measurements, the average value was used as the hardness.

(6) Tensile Strength

Tensile strength is a numerical value of the force of maximum stress per unit area of a cured product, and is a property indicating how well it withstands force.

Specifically, a universal testing machine was used, and after preparing a specimen (rubber specimen) of the sealant composition according to the ASTM D412, tensile strength was measured by pulling from the measuring device at a rate of 500 mm/min, and an average value of four specimens was used.

(7) Elongation

Elongation is a property indicating the extent to which the length is stretched, and an increase in the length of the final elongated specimen at the time of specimen fracture was expressed as a percentage with respect to the initial length of the specimen.

As the measuring device, a universal testing machine was used, and elongation may be measured when measuring tensile strength, and the initial length of the specimen was based on 2 cm. Specifically, a universal testing machine was used, and after preparing a specimen (rubber specimen) of the sealant composition according to the ASTM D412, elongation was measured by pulling from the measuring device at a rate of 500 mm/min, and an average value of four specimens was used.

(8) Dry to Touch Property

After coating the sealant composition using a joint, the time during which the sealant composition on the surface does not smear hand was measured to measure a dry to touch property. In addition, after storing the sealant composition for 1 week at 80° C., a dry to touch property was measured in the same manner as above.

(9) Depth of Curing

The sealant composition was injected into a cylinder-shaped container having a diameter of 20 mm and a height of 20 mm, and after leaving the result unattended for 15 hours and 24 hours at 0° C. or 23° C., the cured sealant was separated using a knife, and the residual uncured portion was removed. After that, for the separated sealant, the cured depth from the surface was measured, which was employed as depth of curing (mm).

TABLE 5

| | | Target | Experimental Example 1 | Experimental Example 2 | Experimental Example 3 | Experimental Example 4 | Experimental Example 5 | Experimental Example 6 |
|---|---|---|---|---|---|---|---|---|
| Adhesiveness | | 100% CF (Cohesive Failure) | 100% CF | 100% CF | 100% CF | 100% CF | 100% CF | 100% CF |
| Amount of Discharge (g) | | 50 g to 110 g | 73 | 85 | 62 | 88 | 51 | 82 |
| Slump (mm) | 23° C. | 2 mm or less | 0 | 0 | 0 | 0 | 0 | 2 |
| | After storing at 80° C. | 5 mm or less | 1 | 2 | 2 | 3 | 3 | 5 |
| Viscosity (cP) | 5 rpm | 450,000 cP to 850,000 cP | 576000 | 520000 | 700000 | 510000 | 700000 | 530000 |
| | 50 rpm | 120,000 cP to 200,000 cP | 139000 | 130000 | 150000 | 120000 | 145000 | 135000 |
| Thixotropy | | 3.8 to 5.5 | 4.14 | 4.00 | 4.67 | 4.25 | 4.83 | 3.93 |
| Hardness (Shore A) | | 30 to 60 | 40 | 35 | 45 | 33 | 47 | 37 |
| Tensile Strength (MPa) | | 1.4 MPa or greater | 1.83 | 1.63 | 1.9 | 1.41 | 1.95 | 1.6 |
| Elongation (%) | | 100% or greater | 154 | 131 | 160 | 105 | 170 | 160 |
| Dry to Touch | 23° C. | 10 minutes or less | 5 | 4 | 6 | 5 | 5 | 5 |
| Property (Minute) | After storing at 80° C. | 25 minutes or less | 17 | 15 | 10 | 20 | 20 | 21 |
| Depth of Curing | 0° C., 15 hours | 1 mm or greater | 1.15 | 1.05 | 1.25 | 1.22 | 1.22 | 1.26 |
| (mm) | 0° C., 24 hours | 1.2 mm or greater | 1.49 | 1.29 | 1.6 | 1.55 | 1.55 | 1.61 |
| | 23° C., 15 hours | 1.8 mm or greater | 2.27 | 2.02 | 2.4 | 2.3 | 2.3 | 2.2 |
| | 23° C., 24 hours | 2.3 mm or greater | 2.9 | 2.7 | 3.1 | 2.95 | 2.95 | 2.85 |

TABLE 6

| | | Target | Experimental Example 7 | Experimental Example 8 | Experimental Example 9 | Experimental Example 10 | Experimental Example 11 | Experimental Example 12 |
|---|---|---|---|---|---|---|---|---|
| Adhesiveness | | 100% CF (Cohesive Failure) | 100% CF | 100% CF | 100% CF | 100% CF | 100% CF | 100% CF |
| Amount of Discharge (g) | | 50 g to 110 g | 60 | 71 | 71 | 71 | 30 | 84 |
| Slump (mm) | 23° C. | 2 mm or less | 0 | 0 | 2 | 0 | 0 | 4 |
| | After storing at 80° C. | 5 mm or less | 3 | 3 | 5 | 4 | 1 | 9 |
| Viscosity (cP) | 5 rpm | 450,000 cP to 850,000 cP | 650000 | 550000 | 550000 | 594000 | 720000 | 486000 |
| | 50 rpm | 120,000 cP to 200,000 cP | 152000 | 138000 | 139000 | 156000 | 210000 | 126000 |
| Thixotropy | | 3.8 to 5.5 | 4.28 | 3.99 | 3.96 | 3.81 | 3.43 | 3.86 |
| Hardness (Shore A) | | 30 to 60 | 40 | 30 | 48 | 42 | 40 | 46 |
| Tensile Strength (MPa) | | 1.4 MPa or greater | 1.88 | 1.68 | 1.72 | 1.8 | 1.86 | 1.7 |
| Elongation (%) | | 100% or greater | 103 | 140 | 145 | 125 | 210 | 159 |
| Dry to Touch | 23° C. | 10 minutes or less | 5 | 5 | 5 | 4 | 4 | 6 |
| Property (Minute) | After storing at 80° C. | 25 minutes or less | 22 | 20 | 23 | 20 | 17 | 20 |
| Depth of Curing | 0° C., 15 hours | 1 mm or greater | 1.22 | 1.01 | 1.25 | 1.3 | 1.25 | 1.34 |
| (mm) | 0° C., 24 hours | 1.2 mm or greater | 1.58 | 1.25 | 1.55 | 1.7 | 1.56 | 1.54 |

TABLE 6-continued

| | | Target | Experimental Example 7 | Experimental Example 8 | Experimental Example 9 | Experimental Example 10 | Experimental Example 11 | Experimental Example 12 |
|---|---|---|---|---|---|---|---|---|
| | 23° C., 15 hours | 1.8 mm or greater | 2.12 | 1.86 | 2.25 | 2.4 | 2.37 | 2.42 |
| | 23° C., 24 hours | 2.3 mm or greater | 2.65 | 2.33 | 2.8 | 3.1 | 2.96 | 2.86 |

TABLE 7

| | | Target | Experimental Example 13 | Experimental Example 14 | Experimental Example 15 | Experimental Example 16 | Experimental Example 17 | Experimental Example 18 |
|---|---|---|---|---|---|---|---|---|
| Adhesiveness | | 100% CF (Cohesive Failure) | 100% CF | 100% CF | 100% CF | 100% CF | 100% CF | 100% CF |
| Amount of Discharge (g) | | 50 g to 110 g | 25 | 87 | 45 | 72 | 80 | 70 |
| Slump (mm) | 23° C. | 2 mm or less | 0 | 5 | 0 | 3 | 3 | 0 |
| | After storing at 80° C. | 5 mm or less | 2 | 11 | 1 | 15 | 7 | 2 |
| Viscosity (cP) | 5 rpm | 450,000 cP to 850,000 cP | 873000 | 520000 | 780000 | 556800 | 465000 | 512000 |
| | 50 rpm | 120,000 cP to 200,000 cP | 230000 | 180000 | 180000 | 142300 | 160000 | 132500 |
| Thixotropy | | 3.8 to 5.5 | 3.80 | 2.89 | 4.33 | 3.91 | 2.91 | 3.86 |
| Hardness (Shore A) | | 30 to 60 | 48 | 37 | 49 | 42 | 43 | 23 |
| Tensile Strength (MPa) | | 1.4 MPa or greater | 1.73 | 1.42 | 1.8 | 1.65 | 1.53 | 1.45 |
| Elongation (%) | | 100% or greater | 90 | 180 | 160 | 145 | 140 | 190 |
| Dry to Touch | 23° C. | 10 minutes or less | 6 | 5 | 5 | 5 | 5 | 40 |
| Property (Minute) | After storing at 80° C. | 25 minutes or less | 19 | 16 | 16 | 19 | 17 | 68 |
| Depth of Curing | 0° C., 15 hours | 1 mm or greater | 1.41 | 1.35 | 1.26 | 1.32 | 1.31 | 0.92 |
| (mm) | 0° C., 24 hours | 1.2 mm or greater | 1.78 | 1.59 | 1.62 | 1.76 | 1.72 | 1.23 |
| | 23° C., 15 hours | 1.8 mm or greater | 2.75 | 2.43 | 2.71 | 2.86 | 2.74 | 1.76 |
| | 23° C., 24 hours | 2.3 mm or greater | 3.06 | 2.97 | 3.12 | 3.05 | 2.92 | 2.29 |

TABLE 8

| | | Target | Experimental Example 19 | Experimental Example 20 | Experimental Example 21 | Experimental Example 22 | Experimental Example 23 | Experimental Example 24 |
|---|---|---|---|---|---|---|---|---|
| Adhesiveness | | 100% CF (Cohesive Failure) | 100% CF | 100% CF | 100% CF | 100% CF | 100% CF | 100% CF |
| Amount of Discharge (g) | | 50 g to 110 g | 76 | 85 | 20 | 90 | 95 | 86 |
| Slump (mm) | 23° C. | 2 mm or less | 0 | 5 | 0 | 4 | 6 | 5 |
| | After storing at 80° C. | 5 mm or less | 1 | 25 | 2 | 10 | 28 | 21 |
| Viscosity (cP) | 5 rpm | 450,000 cP to 850,000 cP | 532000 | 526000 | 1050000 | 460000 | 415000 | 460000 |
| | 50 rpm | 120,000 cP to 200,000 cP | 140000 | 180000 | 280000 | 190000 | 116000 | 143000 |
| Thixotropy | | 3.8 to 5.5 | 3.80 | 2.92 | 3.75 | 2.42 | 3.58 | 3.22 |
| Hardness (Shore A) | | 30 to 60 | 51 | 19 | 58 | 31 | 41 | 38 |
| Tensile Strength (MPa) | | 1.4 MPa or greater | 1.46 | 1.2 | 2.2 | 1.49 | 1.51 | 1.55 |
| Elongation (%) | | 100% or greater | 180 | 280 | 190 | 160 | 160 | 170 |
| Dry to Touch | 23° C. | 10 minutes or less | 4 | 5 | 5 | 5 | 7 | 6 |
| Property (Minute) | After storing at 80° C. | 25 minutes or less | 15 | 16 | 17 | 22 | 22 | 20 |
| Depth of Curing | 0° C., 15 hours | 1 mm or greater | 1.1 | 1.37 | 1.31 | 1.45 | 1.26 | 1.35 |
| (mm) | 0° C., 24 hours | 1.2 mm or greater | 1.35 | 1.68 | 1.58 | 1.72 | 1.66 | 1.71 |
| | 23° C., 15 hours | 1.8 mm or greater | 1.62 | 2.56 | 2.61 | 2.72 | 2.79 | 2.91 |
| | 23° C., 24 hours | 2.3 mm or greater | 2.06 | 3.05 | 3.18 | 3.23 | 2.95 | 3.15 |

As shown in Tables 5 to 8, it was seen that the compositions of Experimental Examples 1 to 10 had appropriate amount of discharge, slump, viscosity and thixotropy and thereby had excellent workability, had excellent adhesiveness, and the cured product manufactured therefrom had excellent hardness, tensile strength, dry to touch property and depth of curing and was thereby suitable as a sealant for multi-layer glass.

On the other hand, Experimental Example 11 including high-viscosity organohydroxypolysiloxane-2, Experimental Example 13 including an excess amount of carbon black, Experimental Example 15 including an excess amount of precipitated calcium carbonate and a small amount of ground calcium carbonate, and Experimental Example 21 including silica instead of ground calcium carbonate had insufficient workability due to insufficient amount of discharge. Particularly, Experimental Example 11 had insufficient thixotropy, Experimental Example 13 and Experimental Example 21 had very insufficient workability due to excessively high viscosity at 23° C., and Experimental Example 13 had insufficient elongation as well.

Experimental Example 12 including a small amount of carbon black and a small amount of organohydroxypolysiloxane, Experimental Example 14 including a small amount of precipitated calcium carbonate and an excess amount of ground calcium carbonate, Experimental Example 16 including a small amount of thickener and an excess amount of catalyst, Experimental Example 17 including an excess amount of thickener, Experimental Example 20 including silica instead of precipitated calcium carbonate, Experimental Example 22 including an excess amount of organohydroxypolysiloxane without including carbon black, Experimental Example 23 not including a thickener, and Experimental Example 24 including thickener-2 (polypropylene glycol) had insufficient slump. Particularly, Experimental Example 14, Experimental Example 17, Experimental Example 20 and Experimental Examples 22 to 24 had insufficient thixotropy as well, Experimental Example 20 had insufficient tensile strength and hardness as well, and Experimental Example 23 had insufficient viscosity as well.

In addition, Experimental Example 18, which included the second curing agent including only MOS and TOS as the curing agent, had insufficient hardness, dry to touch property and depth of curing.

Experimental Example 19 including only the first curing agent (VOS) had very insufficient depth of curing measured after leaving the sample unattended at 23° C.

What is claimed is:

1. A sealant composition, comprising:

organohydroxypolysiloxane;

precipitated calcium carbonate;

ground calcium carbonate;

carbon black;

a thickener; and a curing agent, wherein the thickener comprises polyether-modified organopolysiloxane, wherein the precipitated calcium carbonate has a BET specific surface area of 10 $m^2/g$ to 50 $m^2/g$ and an average particle diameter of 0.01 μm to 0.5 μm, wherein the ground calcium carbonate has a BET specific surface area of 0.1 $m^2/g$ to 5 $m^2/g$ and an average particle diameter of 1 μm to 10 μm, and wherein the precipitated calcium carbonate, the ground calcium carbonate, and the carbon black are included in a weight ratio of 1.2 to 7:8 to 20:1.

2. The sealant composition of claim 1, wherein the organohydroxypolysiloxane has viscosity of 1,000 to 10,000 cP at 25° C., and has a hydroxyl group content of 0.01 to 0.5% by weight.

3. The sealant composition of claim 1, wherein the thickener has a hydrophile-lipophile balance (HLB) value of 5 to 20, and has viscosity of 100 to 500 cP at 25° C.

4. The sealant composition of claim 1, wherein the thickener is represented by the following Chemical Formula 1:

[Chemical Formula 1]

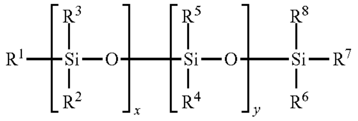

in Chemical Formula 1, $R^1$ to $R^4$ and $R^6$ to $R^8$ are each independently a substituted or unsubstituted $C_{1-10}$ alkyl group;

$R^5$ is represented by the following Chemical Formula 2; and x and y are each independently from 0.1 to 15,

[Chemical Formula 2]

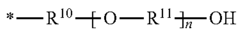

in Chemical Formula 2, $R^{10}$ and $R^{11}$ are each independently a substituted or unsubstituted $C_{1-10}$ alkylene group;

n is from 5 to 20; and

* is a bonding hand bonding to silicon.

5. The sealant composition of claim 1, comprising:

30 to 40% by weight of the organohydroxypolysiloxane;

6 to 15% by weight of the precipitated calcium carbonate;

36 to 50% by weight of the ground calcium carbonate;

2 to 5% by weight of the carbon black;

0.01 to 0.5% by weight of the thickener; and 1.2 to 7% by weight of the curing agent.

* * * * *